United States Patent
Williams et al.

(10) Patent No.: US 8,439,151 B2
(45) Date of Patent: May 14, 2013

(54) APPARATUS FOR USE IN TURNING STEERABLE VEHICLE WHEELS

(75) Inventors: Daniel E. Williams, Lebanon, IN (US); Mark A. Cartwright, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/241,312

(22) Filed: Sep. 23, 2011

(65) Prior Publication Data

US 2013/0075186 A1   Mar. 28, 2013

(51) Int. Cl.
*B62D 5/06* (2006.01)
(52) U.S. Cl.
USPC ............................ 180/421; 180/417; 180/441
(58) Field of Classification Search .................. 180/417, 180/421, 422, 423, 426, 427, 428, 429, 439, 180/441, 442; 476/36, 38
See application file for complete search history.

(56) References Cited

U.S. PATENT DOCUMENTS

| 4,170,438 | A | * | 10/1979 | Kondo et al. | .................. 417/223 |
| 4,173,152 | A | * | 11/1979 | Kondo et al. | ...................... 476/9 |
| 5,184,693 | A | * | 2/1993 | Miller | ........................... 180/423 |
| 6,241,636 | B1 | | 6/2001 | Miller | |
| 7,011,600 | B2 | | 3/2006 | Miller et al. | |
| 7,225,894 | B2 | * | 6/2007 | Broughton | .................... 180/432 |
| 7,364,004 | B2 | | 4/2008 | Williams | |

* cited by examiner

*Primary Examiner* — Kevin Hurley
*Assistant Examiner* — Marc A Scharich
(74) *Attorney, Agent, or Firm* — Tarolli, Sundheim, Covell & Tummino LLP

(57) ABSTRACT

An apparatus includes a hydraulic power steering motor. A continuously variable transmission has an input shaft rotatable under the influence of force transmitted from the engine and an output shaft operable to drive a pump. The continuously variable transmission is operable to drive the pump at a first speed when one of the input and output shafts of the continuously variable transmission rotates at a first speed. The continuously variable transmission is operable to drive the pump at a second speed when the one of the input and output shafts rotates at a second speed. A centrifugal sensor is connected with the one of the input and output shafts. The centrifugal sensor transfers rotational movement of the one of the input and output shafts to a linearly displaceable input member of the continuously variable transmission to change the speed at which the pump is driven.

14 Claims, 3 Drawing Sheets

US 8,439,151 B2

APPARATUS FOR USE IN TURNING STEERABLE VEHICLE WHEELS

BACKGROUND OF THE INVENTION

The present invention relates to an apparatus for use in turning steerable vehicle wheels during operation of a vehicle.

A known apparatus for use in turning steerable vehicle wheels includes a power steering pump. The power steering pump is typically sized to provide maximum rated flow required to dry park a vehicle at engine idle. At highway speeds the engine can operate at two or three times its idle speed. Therefore, the fixed displacement power steering pump may provide excess flow and excess pressure at highway speeds.

Excess flow from the power steering pump is diverted away from a hydraulic steering gear by a flow control valve. Therefore, only the rated flow is received by the hydraulic steering gear. Power consumed by this known system is determined by total flow delivered by the pump as a function of engine speed and the pressure drop of the steering system. One known power steering system having this general construction is disclosed in U.S. Pat. No. 5,184,693.

SUMMARY OF THE INVENTION

The present invention relates to an apparatus for use in turning steerable vehicle wheels including a hydraulic power steering motor connected with the steerable vehicle wheels and operable to turn the steerable vehicle wheels. A pump connected in fluid communication with the hydraulic power steering motor is operable to supply hydraulic fluid to the hydraulic power steering motor during turning of the steerable vehicle wheels. A continuously variable transmission is connected with an engine of the vehicle and with the pump. The continuously variable transmission has an input shaft rotatable under the influence of force transmitted from the engine. The continuously variable transmission has an output shaft operable to drive the pump. The continuously variable transmission is operable to drive said pump at a first speed when one of the input and output shafts rotates at a first speed. The continuously variable transmission is operable to drive the pump at a second speed when the one of the input and output shafts rotates at a second speed. The first speed at which the pump is driven by the continuously variable transmission during a vehicle steering operation is greater than the second speed at which the pump is driven by the continuously variable transmission. A centrifugal sensor is connected with the one of the input and output shafts. The centrifugal sensor transfers rotational movement of the one of the input and output shafts to a linear displaceable input member of the continuously variable transmission to change the speed at which the pump is driven.

In another aspect of the present invention a vehicle steering system includes a hydraulic power steering gear including a hydraulic motor operatively connectable with steerable vehicle wheels for, when connected with the vehicle wheels, steering the vehicle wheels and a hydraulic fluid reservoir. A fixed displacement pump has an inlet port for fluid communication with the reservoir and an outlet port for fluid communication with the steering gear. A continuously variable transmission drives the fixed displacement pump. The continuously variable transmission has a first input driven by the vehicle engine, an output driving the fixed displacement pump, and a second input controlled by a speed of rotation of one of the first input and the output. The first and second inputs cause the fixed displacement pump to be driven at a speed to produce the hydraulic fluid flow for steering the vehicle wheels. A centrifugal sensor is connected with the one of the first input and the output. The centrifugal sensor transfers rotational movement of the one of the first input and the output to a linear displaceable input member of the continuously variable transmission to change the speed at which the pump is driven.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF AN EXEMPLARY EMBODIMENT

Figure 1:
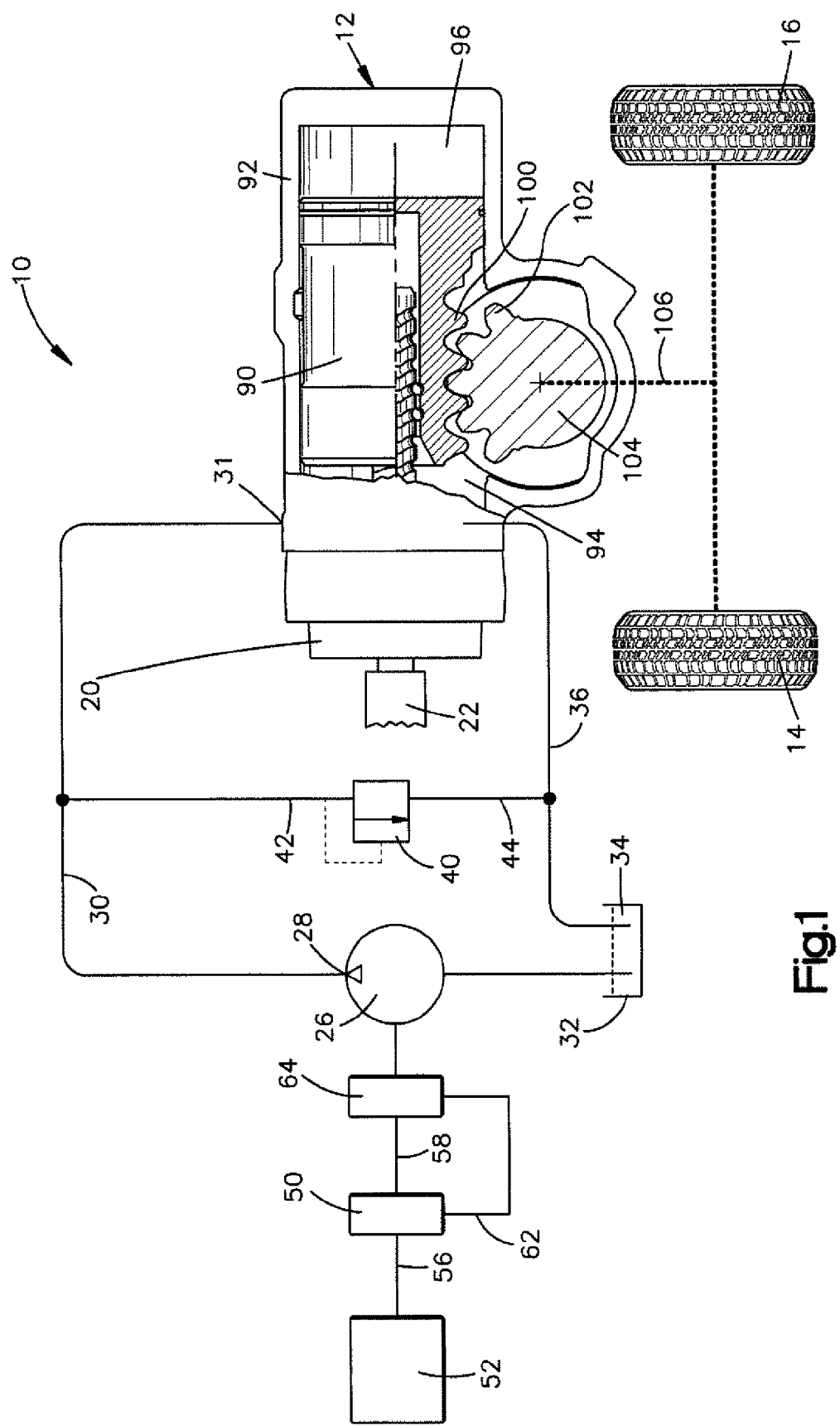
FIG. 1 is a schematic illustration of a first exemplary embodiment of an apparatus for use in turning steerable vehicle wheels constructed in accordance with the present invention.

A vehicle steering apparatus 10 includes a hydraulic power steering motor 12 which is connected with steerable vehicle wheels 14 and 16. A steering control valve 20 is connected with the power steering motor 12. The steering control valve 20 has an input shaft 22 which is connected with a manually rotatable vehicle steering wheel. The steering control valve 20 may be an open center control valve.

A fixed displacement pump 26 has an outlet port 28 connected in fluid communication with the steering control valve 20 and power steering motor 12 by a fluid supply conduit 30. The outlet port 28 of the pump 26 is in fluid communication with an inlet port 31 of the control valve 20. The steering control valve 20 and power steering motor 12 are connected with a reservoir 32 containing hydraulic fluid 34 by a fluid return conduit 36. A pressure relief valve 40 is connected with the fluid supply conduit 30 by a conduit 42 and is connected with the fluid return conduit 36 by a conduit 44.

In accordance with one of the features of the invention, a continuously variable transmission (CVT) 50 is connected with an engine 52 of the vehicle and the pump 26. The CVT 50 is connected with the engine 52 of the vehicle by a first input member or shaft 56 which is rotated at a speed which varies as a direct function of variations in operating speed of the engine 52. The CVT 50 is connected with the pump 26 by an output member or shaft 58.

The CVT 50 includes a linearly displaceable second input member 62. The second input member 62 controls the transmission gear ratio of the CVT 50. The input member 62 is mechanically connected with a centrifugal sensor 64, such as a flyball governor, connected to the output shaft 58. The centrifugal sensor 64 has a portion that rotates with the output shaft 58 to convert rotational speed of the output shaft 58 to a linear displacement. The linear displacement of the centrifugal sensor 64 moves the input member 62 of the CVT 50 to change the transmission gear ratio of the CVT in response to rotational speed of the output shaft 58.

The CVT 50 is operable to drive the pump 26 at a speed which is a function of the rotational speed of the output shaft 58 of the CVT or the speed at which the pump 26 is driven. During operation of the vehicle, the centrifugal sensor 64 transfers rotational speed of the output shaft 58 and/or the speed of the pump 26 to the input member 62 to provide a desired rate of flow of hydraulic fluid from the pump 26 to the steering control valve 20. When the steering control valve 20 demands a pressure, the gear ratio of the CVT 50 is increased to increase the flow from the pump 26. When the input shaft 22 is rotated at lower engine speeds, the output shaft 58 rotates at a lower speed and the centrifugal sensor 64 moves the input member 62 to increase the speed of the pump 26 and the flow of hydraulic fluid to the steering control valve 20.

The CVT 50 may be any continuously variable transmission, such as a NuVinci device manufactured by Fallbrook Technologies. The CVT 50 connects the engine driven input member or shaft 56 with the output member or shaft 58 which drives the pump 26. The CVT 50 also has a linearly displaceable input member 62 that is mechanically acted upon by the centrifugal sensor 64. The rotational speed of the output shaft 58 controls operation of the CVT 50 to change the gear ratio as a function of the rotational speed of the output shaft. Since the output shaft rotates at the same speed as the pump 26, the rotational speed of the pump 26 also controls the operation of the CVT 50. The pump 26 provides a desired fluid flow and pressure during steering operations at any engine speed.

By utilizing the CVT 50, the normal flow control valve which is utilized to divert excess flow of hydraulic fluid from the pump 26 may be eliminated. By using the CVT 50, the pump 26 is driven at the desired speed to produce a desired flow and pressure without the use of a flow control valve. Elimination of the flow control valve reduces the energy and heat generated by the vehicle steering apparatus 10.

The power steering motor 12 includes a generally cylindrical piston 90 which divides a housing 92 into left and right variable volume chambers 94 and 96. The piston 90 has rack teeth 100 which meshingly engage teeth 102 disposed on a sector shaft 104. The sector shaft 104 is operatively connected through a vehicle steering linkage 106 to the steerable vehicle wheels 14 and 16.

Upon operation of the steering control valve 20 in response to rotation of the input shaft 22, high pressure fluid from the pump 26 flows into one of the chambers 94 and 96. In addition, fluid flows from the other chamber to the reservoir 32 through the steering control valve 20 and fluid return conduit 36.

The steering control valve 20 has a known construction. The steering control valve 20 may include a core member which is disposed inside of a sleeve member. A torsion bar may act between the core member and the sleeve member. The general construction of the steering control valve 20 and the manner in which it cooperates with the power steering motor 12 is similar to the disclosure in U.S. Pat. No. 5,184,693.

Figure 2:
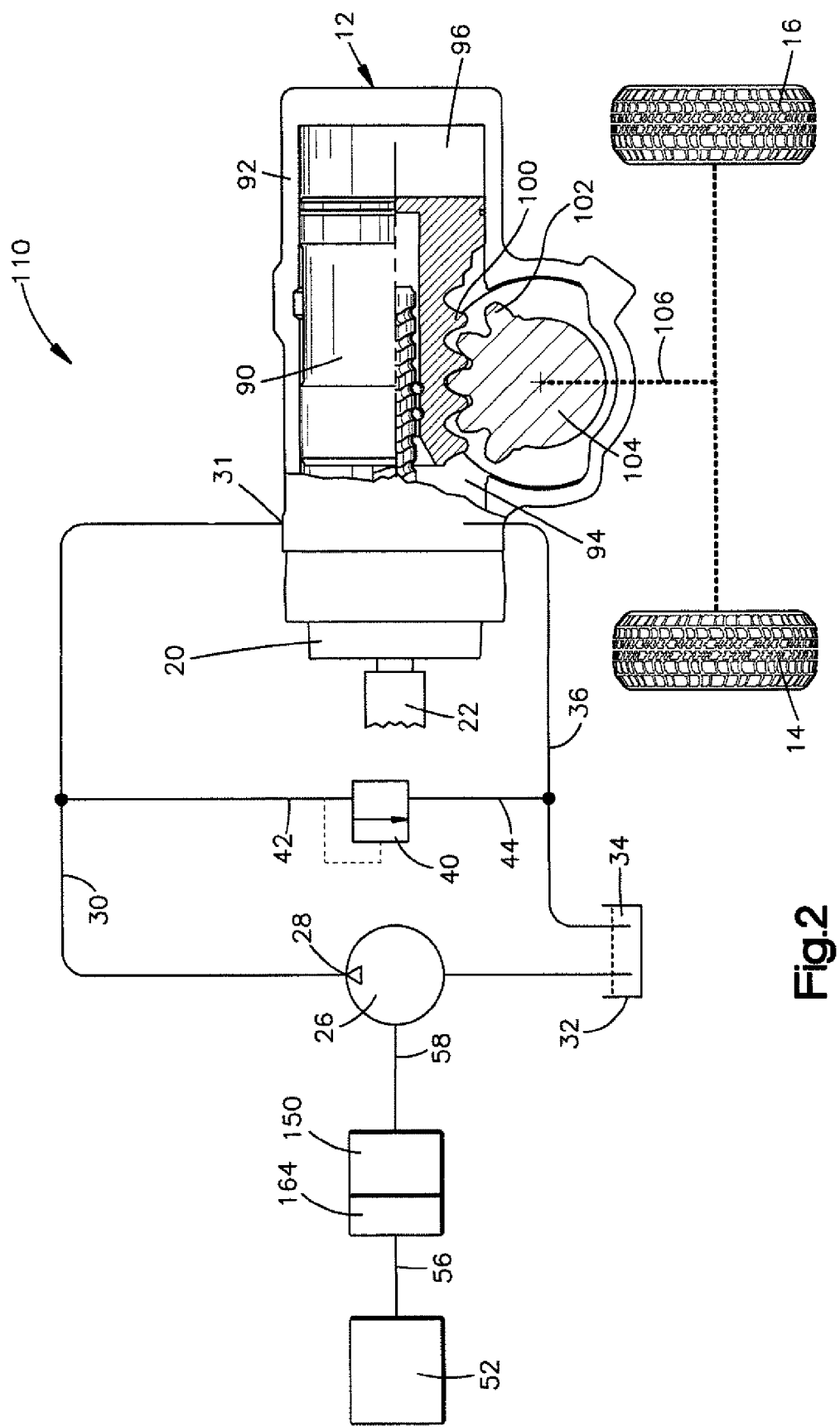
FIG. 2 is a schematic illustration of a second exemplary embodiment of an apparatus for use in turning steerable vehicle wheels constructed in accordance with the present invention.
Figure 3:
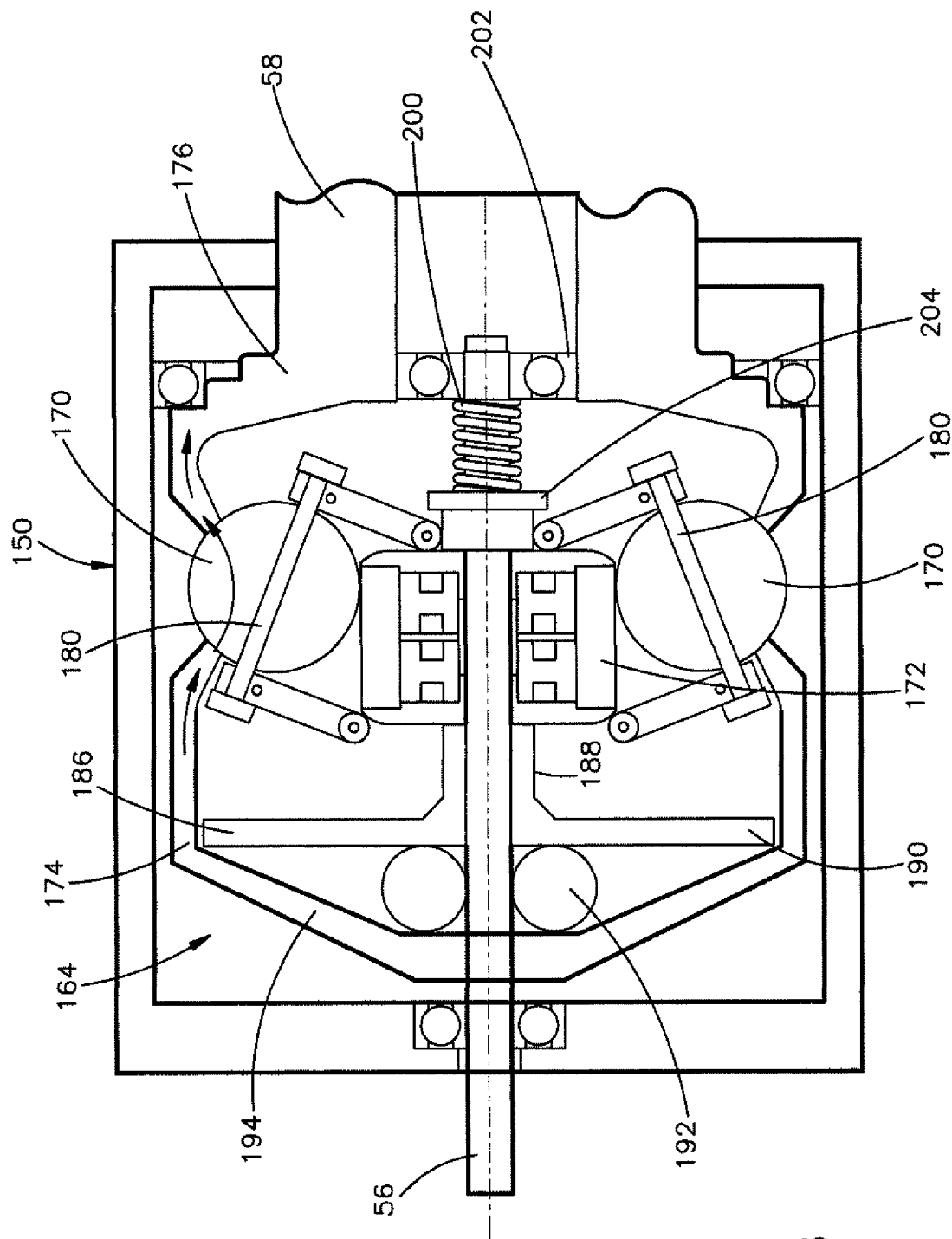
FIG. 3 is a schematic illustration of a continuously variable transmission of the apparatus of FIG. 2.

A second exemplary embodiment of the invention is illustrated in FIGS. 2-3. The centrifugal sensor of the vehicle steering apparatus of FIGS. 2-3 is located within a housing of the continuously variable transmission. The vehicle steering apparatus of FIGS. 2-3 is generally similar to the vehicle steering apparatus of FIG. 1. Accordingly, similar numerals will be used to describe similar components.

The vehicle steering apparatus 110 (FIG. 2) includes a continuously variable transmission (CVT) 150 connected with an engine 52 of the vehicle and a pump 26. The CVT 150 is connected with the engine 52 of the vehicle by an input member or shaft 56 which is rotated at a speed which varies as a direct function of variations in operating speed of the engine 52. The CVT 150 is connected with the pump 26 by an output member or shaft 58.

The CVT 150 includes a centrifugal sensor 164 connected to the input shaft 56. The centrifugal sensor 164 has a portion that rotates with the input shaft 56 to convert rotational speed of the input shaft 56 to a linear displacement. The linear displacement of the centrifugal sensor 164 changes the transmission gear ratio of the CVT 150 in response to rotational speed of the input shaft 56.

A simplified schematic cross section of the CVT 150 is illustrated in FIG. 3. A bank of balls 170 extends in a circular array around a central idler 172 and in contact with separate input and output discs 174, 176. The input disc 174 is connected with the input shaft 56. Accordingly, the input disc 174 rotates with the input shaft 56. The output disc 176 is connected with the output member 58 and, therefore, rotates the output member 58. The balls 170 transmit power from the input disc 174 to the output disc 176 via traction at the rolling contact interface between the balls and discs. The transmission ratio is defined by the tilt angle of the ball axles 180.

A linear displaceable input member 186 is used to modify the axis of rotation for the balls 170. The input member 186 has an axially extending collar 188 through which the input shaft 56 extends. A first axial end of the collar 188 engages the idler 172.

A flange 190 extends radially from a second axial end of the collar 188. The flange 190 engages balls 192 of the centrifugal sensor 164. The balls 192 also engage a concave portion 194 of the input disc 174. The concave portion 194 extends at an angle to the input shaft 56. The balls 192 rotate with the input shaft 56 and the input disc 174 relative to the input member 186 to move radially relative to the input shaft in response to rotation of the input shaft and the input disc. As the balls 192 move radially, the balls move along the concave portion 194 of the input disc 174. The concave portion 194 causes the balls to move axially and move the input member 186 axially relative to the input shaft 56. The axial movement of the input member 186 moves the idler 172 axially to shift the CVT 150 and change the transmission ratio of the CVT.

A spring 200 biases the input member 186 and the CVT 150 into an initial position. The spring 200 extends between a bearing 202 and a bushing 204. The bearing 202 supports the input shaft 56 and the output disc 176 for relative rotation. The bushing 204 engages a side of the idler 172 opposite from the input member 186. As the input member 186 moves toward the right, as viewed in FIG. 3, the idler 172 and the bushing 204 move toward the right and compress the spring 200.

When the input member 186 is moved by the balls 192, the idler 172 causes the axles 180 to pivot. The pivoting of the axles 180 changes the axis of rotation of each of the balls 170. When the input member 186 moves axially to the right as viewed in FIG. 3, the axles 180 of each of the balls 170 is modified such that the input disc 174 contacts a surface of the ball 170 closer to the axis of rotation of the ball. Furthermore, the rotatable output disc 176 contacts the balls 170 at a point on a surface of the each of the balls further away from the axis of rotation of the balls.

The CVT 150 is operable to drive the pump 26 at a speed which is a function of the rotational speed of the input member or shaft 56 of the CVT or the speed at which the engine 52 is driven. During operation of the vehicle, the rotational speed of the input shaft 56 and/or the speed of the engine 52 causes the balls 192 to move radially relative to the input shaft. The balls 192 also move axially to mechanically transfer rotational movement of the input shaft to linear movement of the input member 186. The input member 186 moves to provide a desired rate of flow of hydraulic fluid from the pump 26 to the steering control valve 20. When the steering control valve 20 demands a pressure, the gear ratio of the CVT 150 is increased to increase the flow from the pump 26. When the input shaft 52 is rotated at lower engine speeds, the output member 58 rotates at a lower speed and the centrifugal balls 194 move the input member 186 to increase the speed of the pump 26 and the flow of hydraulic fluid to the steering control valve 20.

The CVT 150 may be any continuously variable transmission, such as a NuVinci device manufactured by Fallbrook Technologies. The CVT 150 connects the engine driven input member or shaft 56 with the output member or shaft 58 which drives the pump 26. The CVT 150 also has a linearly displaceable input member 186 that is acted upon by the centrifugal sensor 164. The rotational speed of the input shaft 56 controls operation of the CVT 150 to change the transmission ratio as a function of the rotational speed of the input shaft. Since the input shaft 56 rotates at the same speed as the engine 52, the rotational speed of the engine 52 also controls the operation of the CVT 150. The pump 26 provides a desired fluid flow and pressure during steering operations at any engine speed.

By utilizing the CVT 150, the normal flow control valve which is utilized to divert excess flow of hydraulic fluid from the pump 26 may be eliminated. By using the CVT 150, the pump 26 is driven at the desired speed to produce a desired flow and pressure without the use of a flow control valve. Elimination of the flow control valve reduces the energy and heat generated by the vehicle steering apparatus 110.

The steering control valve 20 has a known construction. The steering control valve 20 may include a core member which is disposed inside of a sleeve member. A torsion bar may act between the core member and the sleeve member. The general construction of the steering control valve 20 and the manner in which it cooperates with the power steering motor 12 is similar to the disclosure in U.S. Pat. No. 5,184,693.

Although the centrifugal sensor 64 of FIG. 1 is shown as being connected with the output member 58, it is contemplated that the centrifugal sensor may be connected to the input member 56 so that the transmission ratio of the CVT 50 is adjusted in response to rotational speed of the input member 56. Furthermore, the centrifugal sensor 164 of FIGS. 2-3 may be mounted on output member 58 so that the transmission ratio of the CVT 150 is adjusted in response to rotational speed of the output member 58.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels comprising:
   a hydraulic power steering motor operatively connected with the steerable vehicle wheels and operable to turn the steerable vehicle wheels,
   a pump connected in fluid communication with said hydraulic power steering motor and operable to supply hydraulic fluid to said hydraulic power steering motor during turning of the steerable vehicle wheels,
   a continuously variable transmission connected with an engine of a vehicle and with said pump, said continuously variable transmission having an input shaft rotatable under the influence of force transmitted from the engine, said continuously variable transmission having an output shaft operable to drive said pump, said continuously variable transmission being operable to drive said pump at a first speed when one of said input and output shafts rotates at a first speed, said continuously variable transmission being operable to drive said pump at a second speed when said one of said input and output shafts rotates at a second speed, said first speed at which said pump is driven by said continuously variable transmission during a vehicle steering operation is greater than said second speed at which said pump is driven by said continuously variable transmission, and
   a centrifugal sensor connected with said one of said input and output shafts, said centrifugal sensor transferring rotational movement of said one of said input and output shafts to a linearly displaceable input member of said continuously variable transmission to change the speed at which said pump is driven.

2. An apparatus as set forth in claim 1 wherein said centrifugal sensor is mechanically connected to said one of said input and output shafts and mechanically connected to said linearly displaceable input member.

3. An apparatus as set forth in claim 1 wherein said centrifugal sensor includes a portion that rotates with said one of said input and output shafts.

4. An apparatus as set forth in claim 1 wherein said centrifugal sensor is connected with said output shaft.

5. An apparatus as set forth in claim 1 wherein said centrifugal sensor is located within a housing of said continuously variable transmission.

6. An apparatus as set forth in claim 1 wherein said centrifugal sensor is a flyball governor.

7. An apparatus as set forth in claim 1 wherein said centrifugal sensor includes at least one ball rotatable with said one of said input and output shafts, said ball moving radially relative to said one of said input and output shafts to move said linearly displaceable input member to change a transmission ratio of said continuously variable transmission.

8. A vehicle steering system comprising:
   a hydraulic power steering gear including a hydraulic motor operatively connectable with steerable vehicle wheels for, when connected with the vehicle wheels, steering the vehicle wheels,
   a hydraulic fluid reservoir,
   a fixed displacement pump having an inlet port for fluid communication with said reservoir and an outlet port for fluid communication with said steering gear,
   a continuously variable transmission for driving said fixed displacement pump, said continuously variable transmission including a first input driven by a vehicle engine, an output driving said fixed displacement pump, and a second input controlled by a speed of rotation of one of said first input and said output, said first and second inputs causing said fixed displacement pump to be driven at a speed to produce hydraulic fluid flow for steering the vehicle wheels, and
   a centrifugal sensor connected with said one of said first input and said output, said centrifugal sensor transferring rotational movement of said one of said first input and said output to a linearly displaceable input member of said continuously variable transmission to change the speed at which said fixed displacement pump is driven.

9. A system as set forth in claim 8 wherein said centrifugal sensor is mechanically connected to said one of said first input and said output and mechanically connected to said linearly displaceable input member.

10. A system as set forth in claim 8 wherein said centrifugal sensor includes a portion that rotates with said one of said first input and said output.

11. A system as set forth in claim 8 wherein said centrifugal sensor is connected with said output.

12. A system as set forth in claim 11 wherein said centrifugal sensor is a flyball governor.

13. A system as set forth in claim 8 wherein said centrifugal sensor is located within a housing of said continuously variable transmission.

14. A system as set forth in claim 13 wherein said centrifugal sensor includes at least one ball rotatable with said one of said first input and said output, said ball moving radially relative to said one of said first input and said output to move said linearly displaceable input member to change a transmission ratio of said continuously variable transmission.

* * * * *